(12) United States Patent
Wachter et al.

(10) Patent No.: US 9,999,091 B2
(45) Date of Patent: Jun. 12, 2018

(54) SYSTEM AND METHOD FOR NEGOTIATING GROUP MEMBERSHIP FOR AUDIO CONTROLLERS

(71) Applicant: D&M Holdings, Inc., Kanagawa (JP)

(72) Inventors: Martin Richard Wachter, Phoenix, MD (US); Ryouichi Yamanouchi, Kanagawa (JP); Samuel Baxter, North Sydney (AU)

(73) Assignee: D&M Holdings, Inc., Kanagawa (JP)

( * ) Notice: Subject to any disclaimer, the term of this patent is extended or adjusted under 35 U.S.C. 154(b) by 82 days.

(21) Appl. No.: 15/152,649

(22) Filed: May 12, 2016

(65) Prior Publication Data

US 2016/0337190 A1 Nov. 17, 2016

Related U.S. Application Data

(60) Provisional application No. 62/160,204, filed on May 12, 2015.

(51) Int. Cl.
*H04W 4/00* (2018.01)
*H04W 76/02* (2009.01)
*H04L 12/24* (2006.01)
*H04L 12/28* (2006.01)
*H04R 3/12* (2006.01)
*H04L 29/12* (2006.01)
*H04W 84/12* (2009.01)
*H04W 84/22* (2009.01)
(Continued)

(52) U.S. Cl.
CPC ......... *H04W 76/10* (2018.02); *H04L 12/2803* (2013.01); *H04L 41/0806* (2013.01); *H04R 3/12* (2013.01); *H04W 76/02* (2013.01); *H04L 61/2015* (2013.01); *H04R 5/04* (2013.01); *H04R 27/00* (2013.01); *H04R 2227/005* (2013.01); *H04R 2420/07* (2013.01); *H04W 84/12* (2013.01); *H04W 84/22* (2013.01)

(58) Field of Classification Search
CPC ...... H04W 4/206; H04W 84/18; H04W 8/005
USPC ............... 370/328–339; 455/569, 41.2–41.3
See application file for complete search history.

(56) References Cited

U.S. PATENT DOCUMENTS

| 5,838,384 A | 11/1998 | Schindler et al. |
| 6,650,963 B2 | 11/2003 | DiLorenzo |
| 7,149,549 B1 | 12/2006 | Ortiz et al. |

(Continued)

OTHER PUBLICATIONS

International Search Report and Written Opinion for PCT/US16/32092 dated Oct. 14, 2016.

(Continued)

*Primary Examiner* — Iqbal Zaidi
(74) *Attorney, Agent, or Firm* — Peter A. Nieves; Sheehan Phinney Bass & Green PA

(57) ABSTRACT

A method for connecting an audio device to a wireless network is provided. A first audio device on a wireless network receives notice that a second audio device not on the network is available to join the wireless network. The first audio device provides a bridge network apart from the wireless network. A bridge channel is established between the first audio device and the second audio device via the bridge network. The first audio device provides network credentials to the second audio device over the bridge channel. The second audio device uses the credentials to establish a connection with the wireless network.

15 Claims, 8 Drawing Sheets

(51) Int. Cl.
*H04R 5/04* (2006.01)
*H04R 27/00* (2006.01)

(56) References Cited

U.S. PATENT DOCUMENTS

| | | |
|---|---|---|
| 7,574,691 B2 | 8/2009 | Freitas et al. |
| 7,791,594 B2 | 9/2010 | Bunko |
| 7,978,176 B2 | 7/2011 | Forstall |
| 8,111,132 B2 | 2/2012 | Allen et al. |
| 8,116,476 B2 | 2/2012 | Inohara |
| 8,131,389 B1 | 3/2012 | Hardwick et al. |
| 8,214,447 B2 | 7/2012 | Deslippe et al. |
| 8,245,143 B2 | 8/2012 | Yach et al. |
| 8,290,172 B2 | 10/2012 | Langella |
| 8,724,600 B2 | 6/2014 | Ramsey |
| 8,812,051 B2 | 8/2014 | Jouin |
| 8,832,823 B2 | 9/2014 | Boss |
| 8,887,071 B2 | 11/2014 | Yang |
| 9,001,047 B2 | 4/2015 | Forstall |
| 9,504,076 B2 * | 11/2016 | El-Hoiydi ............. H04W 4/206 |
| 2002/0055788 A1 | 5/2002 | Petrie et al. |
| 2002/0101997 A1 | 8/2002 | Curtis et al. |
| 2002/0170061 A1 | 11/2002 | DiLorenzo |
| 2003/0208300 A1 | 11/2003 | DiLorenzo |
| 2005/0111672 A1 | 5/2005 | Chen |
| 2008/0010648 A1 | 1/2008 | Ando et al. |
| 2008/0313568 A1 | 12/2008 | Park et al. |
| 2009/0187842 A1 | 7/2009 | Collins et al. |
| 2010/0121919 A1 | 5/2010 | Hepworth et al. |
| 2010/0138782 A1 | 6/2010 | Rainisto |
| 2010/0260348 A1 | 10/2010 | Bhow et al. |
| 2010/0299639 A1 | 11/2010 | Ramsay et al. |
| 2011/0211219 A1 | 9/2011 | Bradley et al. |
| 2012/0192070 A1 | 7/2012 | De Faria et al. |
| 2012/0269361 A1 | 10/2012 | Bhow et al. |
| 2013/0089026 A1 | 4/2013 | Piper et al. |
| 2013/0154950 A1 | 6/2013 | Kvasnica |
| 2013/0173794 A1 | 7/2013 | Agerbak et al. |
| 2013/0187861 A1 | 7/2013 | Lavallee |
| 2013/0340003 A1 | 12/2013 | Davis et al. |
| 2014/0009676 A1 | 1/2014 | Cannistraro |
| 2014/0022285 A1 | 1/2014 | Stovicek et al. |
| 2014/0078176 A1 | 3/2014 | Li |
| 2014/0164983 A1 | 6/2014 | Schultz et al. |
| 2014/0270306 A1 | 9/2014 | Luna et al. |
| 2014/0283136 A1 | 9/2014 | Dougherty et al. |
| 2014/0334644 A1 | 11/2014 | Selig et al. |
| 2014/0355389 A1 | 12/2014 | Reunamaki |
| 2015/0181010 A1 * | 6/2015 | Bran ................... H04M 1/6066 455/557 |
| 2015/0195649 A1 * | 7/2015 | Vogt ....................... G08C 17/02 340/4.42 |

OTHER PUBLICATIONS

International Search Report for PCT/US16/31964 dated Aug. 18, 2016.

International Search Report and Written Opinion for PCT/US16/49425 dated Oct. 28, 2016.

Cheng, et al. IrotateGrasp: automatic screen rotation based on grasp of mobile devices. Proceedings of the SIGCHI conference on Human Factors in computing Systems; 3051-3054; 2013.

Kim et al; Huffman user interface for fill touch screen based mobile phones. Proceedings of the 12th International Conference on Advanced Communication Technology; 1021-1026; 2010.

\* cited by examiner

SYSTEM AND METHOD FOR NEGOTIATING GROUP MEMBERSHIP FOR AUDIO CONTROLLERS

CROSS-REFERENCE TO RELATED APPLICATIONS

This application claims the benefit of U.S. Provisional Patent Application Ser. No. 62/160,204, filed May 12, 2015, entitled "Method for Negotiating Group Membership for Audio Controllers," which is incorporated by reference herein in its entirety.

FIELD OF THE INVENTION

The present invention relates to communications networks, and more particularly, is related to networked audio controllers.

BACKGROUND OF THE INVENTION

While home wireless networks have increased in popularity, configuration of devices being added to a wireless network may be cumbersome. For example, adding a device to a WiFi network generally involves entering the correct network credentials into the device, including the type of network protocol, the network name, the type of security used by that network (WEP, WPA, etc.), and a password for that network.

In order to simplify this process, various protocols have been developed. For example, Wi-Fi Protected Setup (WPS) is a protocol where a user may manually place the router providing the wireless network and the new device in a discovery mode, where the router provides network credentials to the device. This protocol is router based. However, this may be problematic in some circumstances. For example, WPS may require physical access to the router, which may be unavailable. Further, not all routers support WPS. Therefore, there is a need in the industry to overcome one or more of the abovementioned shortcomings.

SUMMARY OF THE INVENTION

Embodiments of the present invention provide a system and method for negotiating group membership for audio controllers. Briefly described, the present invention is directed to a method for connecting an audio device to a wireless network is provided. A first audio device on a wireless network receives notice that a second audio device not on the network is available to join the wireless network. The first audio device provides a bridge network apart from the wireless network. A bridge channel is established between the first audio device and the second audio device via the bridge network. The first audio device provides network credentials to the second audio device over the bridge channel. The second audio device uses the credentials to establish a connection with the wireless network.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

DETAILED DESCRIPTION

Figure 1:
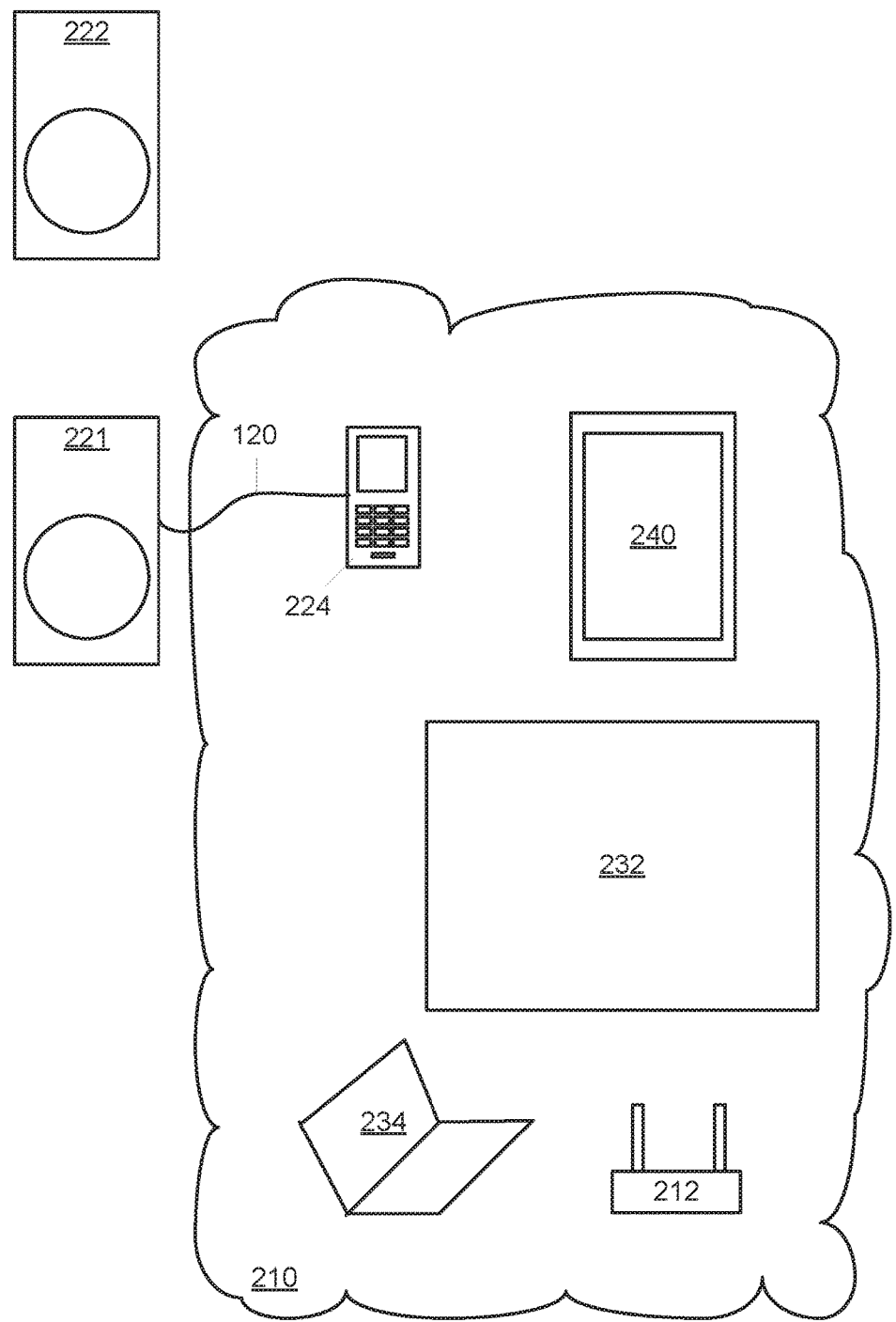
FIG. 1 is a schematic diagram showing a wireless network during manual network configuration of a first player.

Reference will now be made in detail to embodiments of the present invention, examples of which are illustrated in the accompanying drawings. Wherever possible, the same reference numbers are used in the drawings and the description to refer to the same or like parts.

As used within this disclosure, "network credentials" may refer to, but not is limited to, the type of network protocol, the network name, the type of security used by that network (WEP, WPA, etc.), and a password for that network.

As used within this disclosure, a "player" refers to an exemplary audio device, for example, a powered speaker, preamp, amplifier, receiver, etc. The term player is not intended to convey that the audio device is capable, on its own, of rendering an audio signal.

FIG. 1 is a schematic diagram showing a wireless network during manual network configuration of a first player. As shown by FIG. 1, a communications network 210, for example, a home WiFi network including a WiFi router 212 or wireless access point, may be in communication with multiple WiFi enabled devices, for example, a smart phone 224, a laptop computer, 234, a television 232, and a tablet computer 240. A first audio device 221 and a second audio device 222 are WiFi enabled, but are not configured to communicate with the network 210. The WiFi network may be, for example, an IEEE 802.11bgn network, among other possible networks.

A computing device, for example, one or more of the smart phone 224, the laptop computer 234, and the tablet computer 240, is configured to run an application controlling one or more audio devices 221, 222. For simplicity, a first exemplary embodiment assumes the smart phone 224 is hosting the controller application, and may be referred to hereafter as the controller 224.

The controller 224 allows a user of the controller application to control and/or configure one or more audio devices, for example, the audio devices 221, 222. The audio devices 221, 222 may be, for example, speakers containing audio amplifiers and a WiFi interface configured to render a received music stream. For example, the audio devices 221, 222 may render a music stream received from the controller 224 or another streaming source via the network 210. While the described embodiments herein generally include players as audio devices for exemplary purposes, audio devices are not limited to players, and may also include other WiFi enabled audio devices, for example, pre-amplifiers and/or audio processors.

The audio devices 221, 222 may both be a single type of device, or they may be different types of devices. Once the audio devices 221, 222 are added to the network 210, the controller 224 may allow a user of the controller 224 to control the audio devices 221, 222. For example, the user of the controller 224 may use the controller 224 to control operating parameters of the audio devices 221, 222, such as volume, balance, and/or equalization. The controller 224 may directly stream program material, such as an audio stream, to the audio devices 221, 222, or may select program material to be streamed to the audio devices 221, 222 from an internet source via the router 212 of the WiFi network 210.

Figure 7:
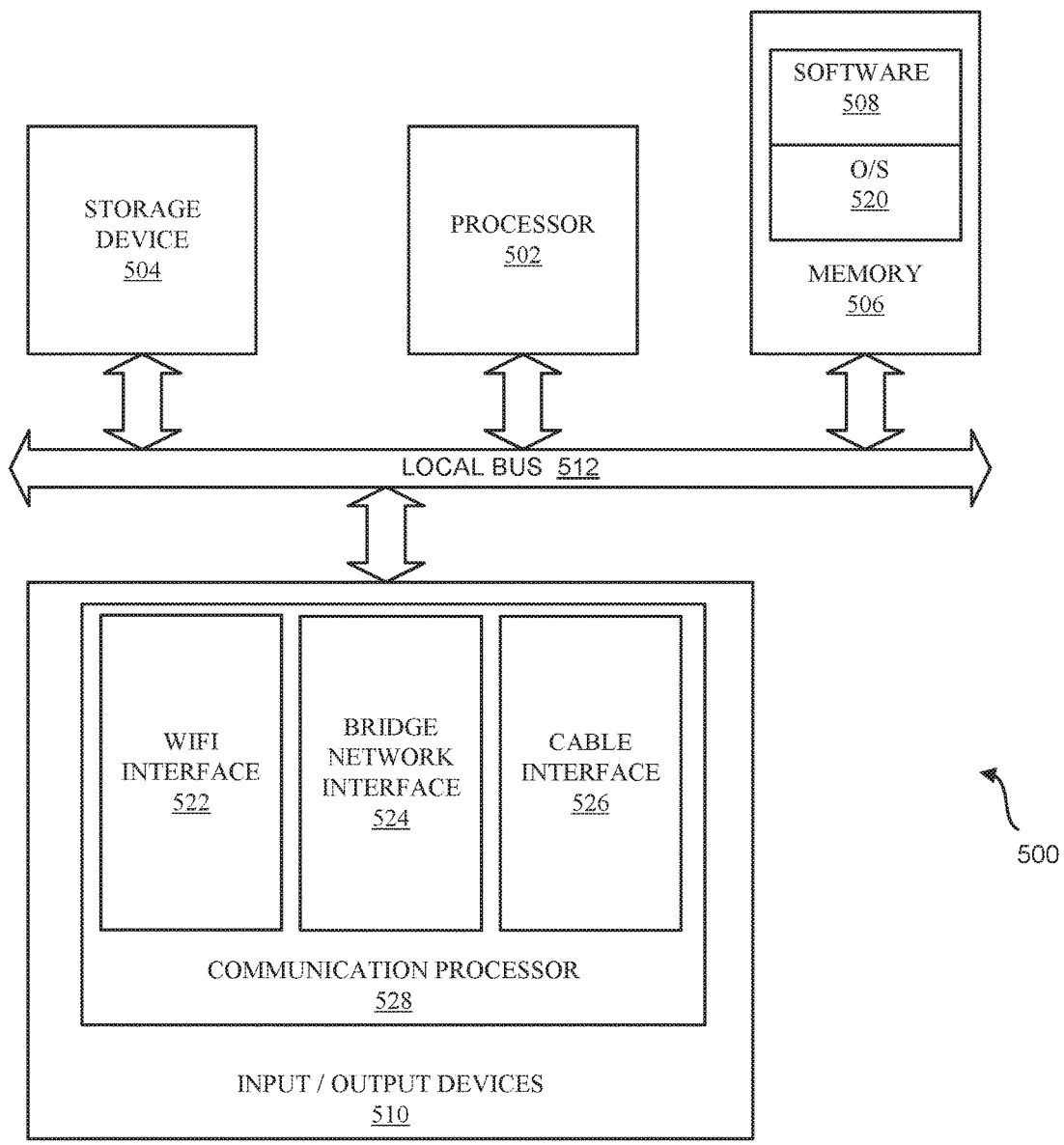
FIG. 7 is a schematic diagram illustrating an example of a system for executing functionality of the present invention.

The audio devices 221, 222, may include a processor or a computer system 500 (FIG. 7), described further below. Initially, the audio devices 221, 222 are not configured to communicate via the network 210, so the controller 224 may communicate with the players 221, 222 via another means, for example, a Bluetooth connection or a hard-wired connection. For example, the controller 224 may be physically connected to the first audio device 221 via a cable 120, for example, an analog audio cable, an ethernet cable, or a Universal Serial Bus (USB) cable. The controller 224 establishes a communication channel with the first player 221 over the cable 120, for example, a duplex communication channel. The controller 224 may provide network credentials for the network 210 to the first audio device 221 over the cable 210. For example, the controller 224 may have received the provided network credentials from the user 225 when the user 225 provisions the first audio device 221 to access the WiFi network 210.

Figure 2:
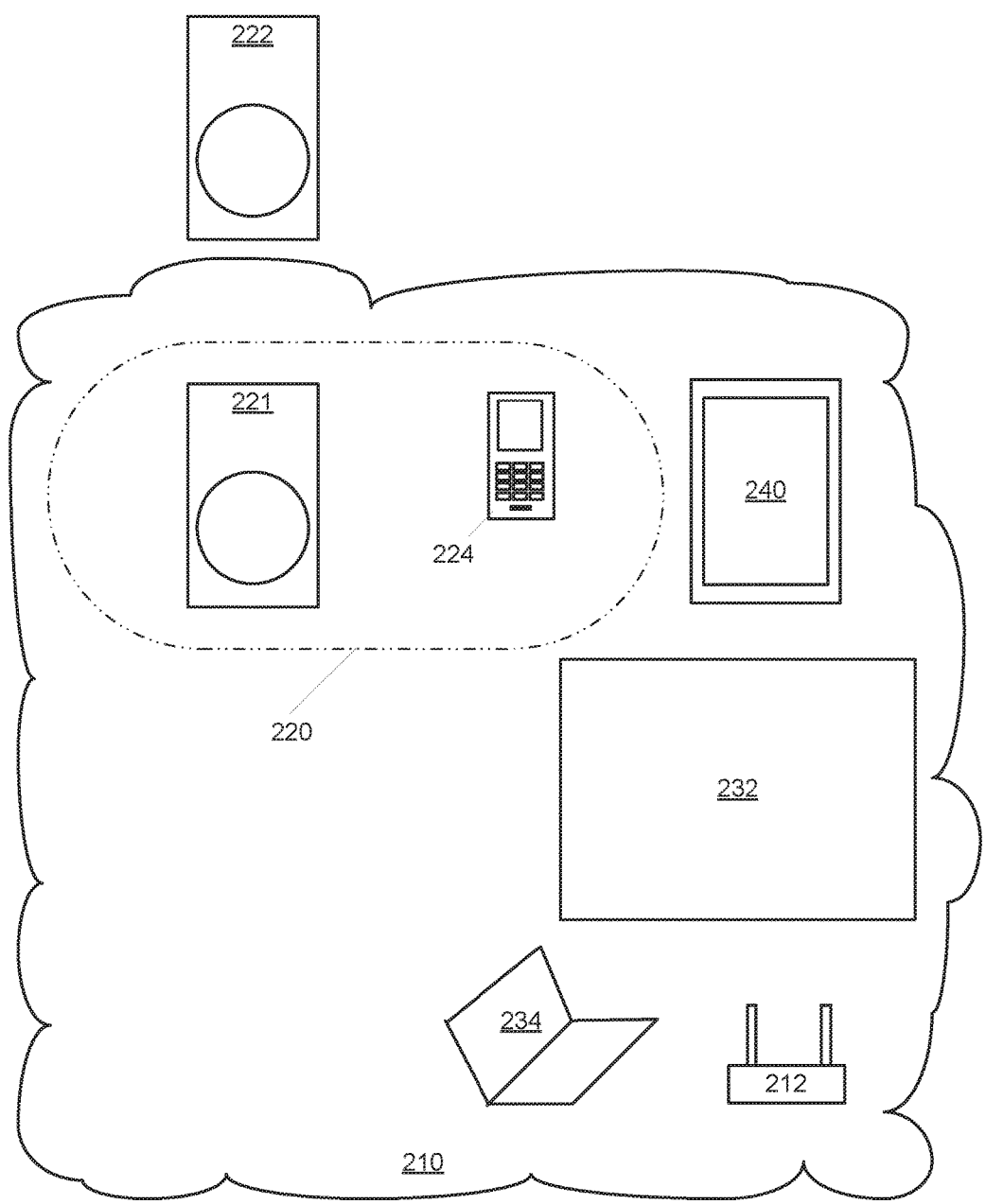
FIG. 2 is a schematic diagram showing the wireless network after the first player has joined the network.
Figure 3:
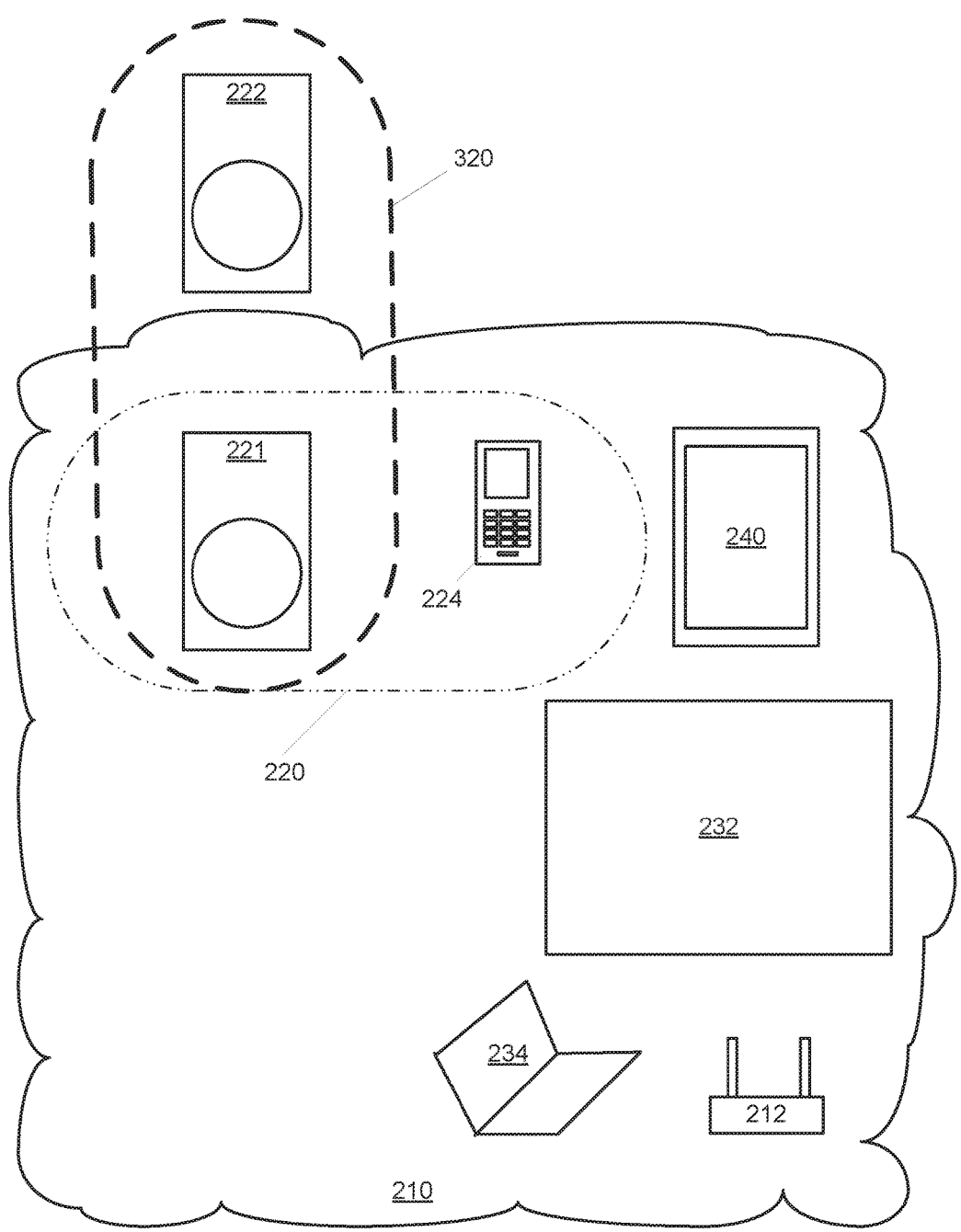
FIG. 3 is a schematic diagram showing the wireless network with the first player in a bridging network with a second player.
Figure 4:
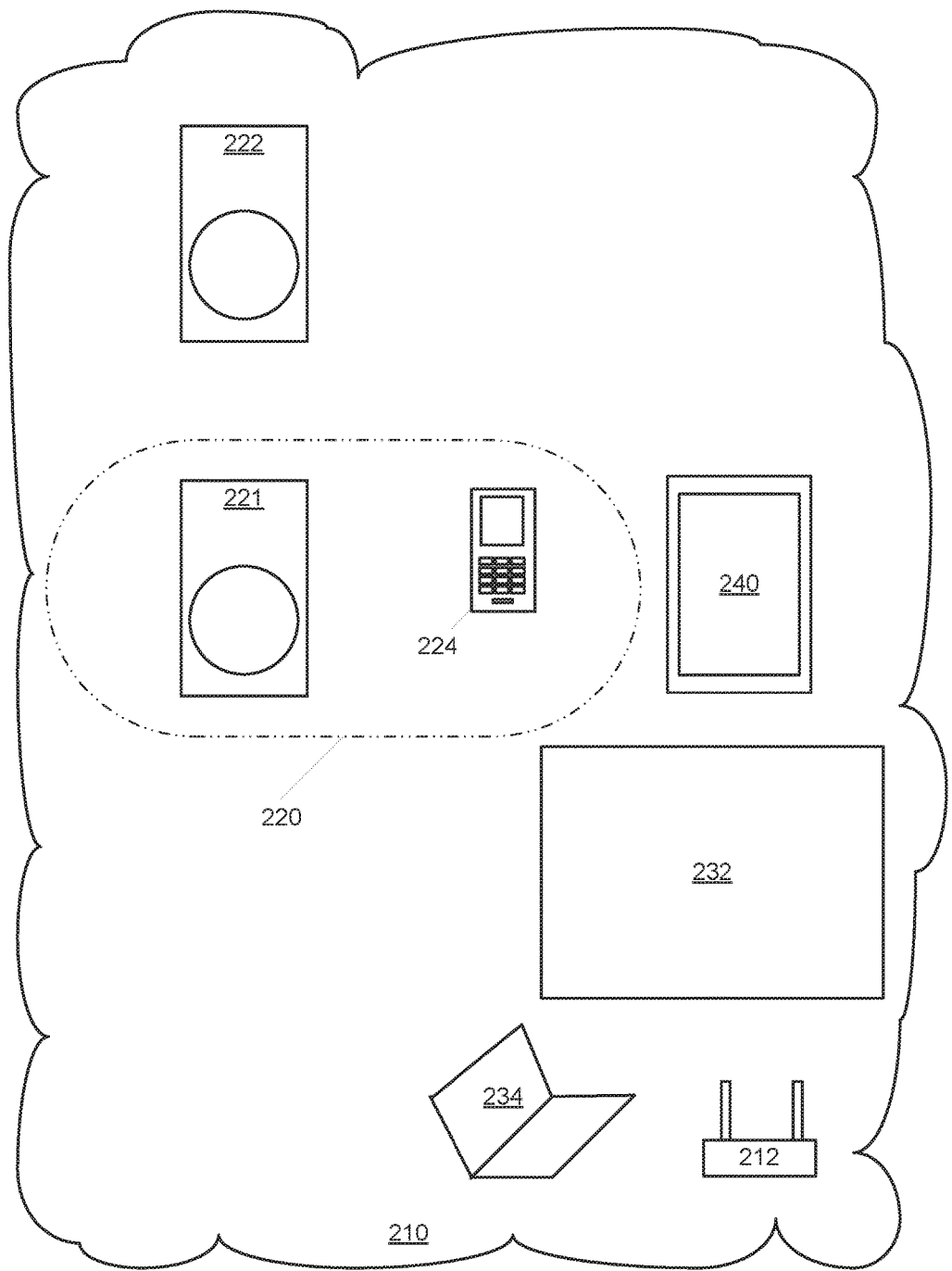
FIG. 4 is a schematic diagram showing the wireless network after the second player has joined the network.

The first audio device 221 establishes a connection with the network 210 ("joins the network") with the provided network credentials, as shown in FIG. 2. The cable 120 (FIG. 1) between the controller 224 and the first audio device 221 may optionally be disconnected. The controller 224 discovers the first player 221, and adds the first audio device 221 to a group 220. The group 220 may include the controller 224 and one or more audio devices that may be configured by and/or controlled by the controller 224. As shown in FIG. 2, the group 220 includes the audio device 221 and the controller 224. The group may be, for example, a collection of one or more audio and/or video devices that are configured to collectively render a multi-channel audio and/or audio/video program, for example, a stereo pair, a stereo pair with subwoofer (2.1), a surround system including front, rear, center, and subwoofer speakers (5.1, 7.1, 7.2), among other collections. Each device in the group 220 may be configured by the controller 224 to render one or more channels of the multi-channel audio and/or audio/video program.

Figure 5:
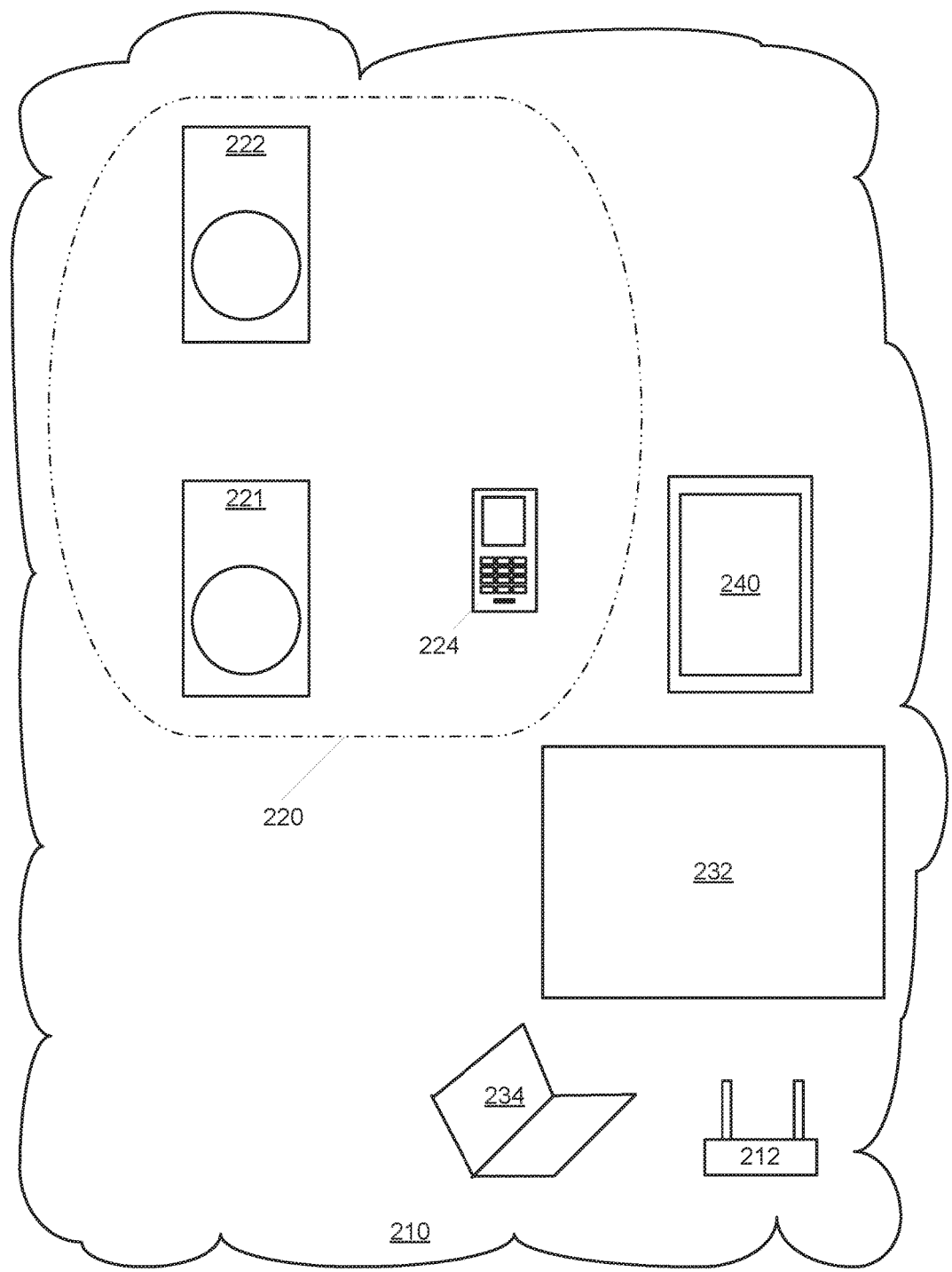
FIG. 5 is a schematic diagram showing the wireless network after the controller has discovered the second player.
Figure 6:
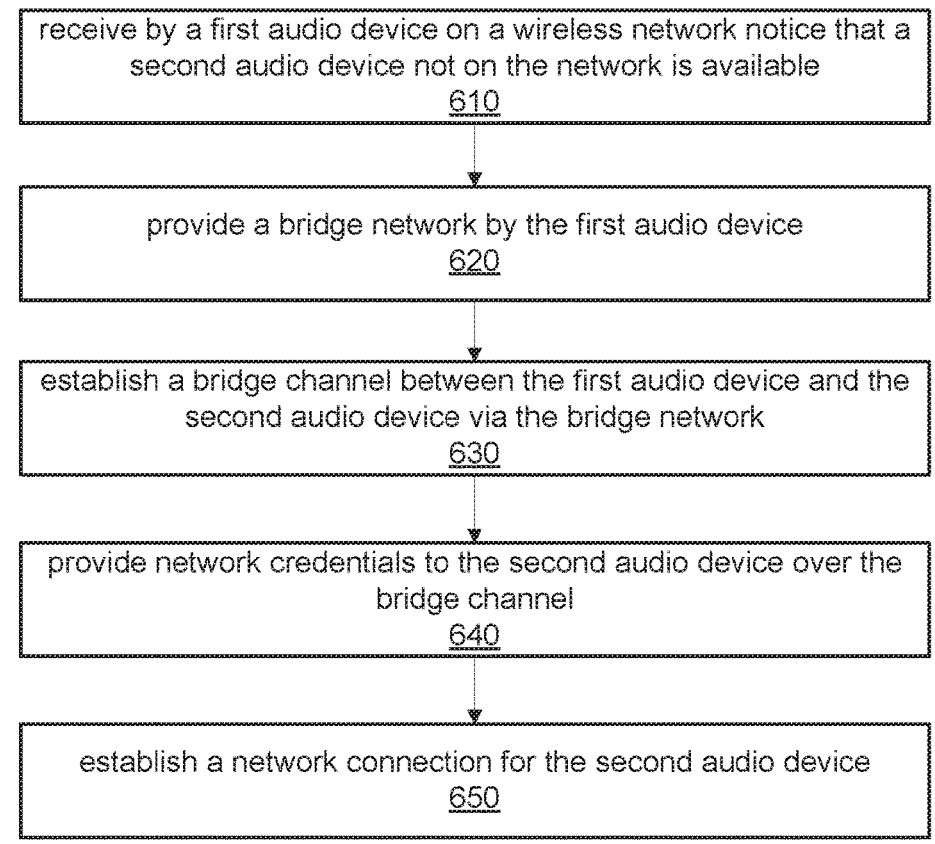
FIG. 6 is a flowchart of an exemplary method for configuring an audio device to join a wireless network.
Figure 6:

FIG. 6 is a flowchart of an exemplary embodiment of a method to wirelessly add a second player 222 (FIG. 2) to the network 210 (FIG. 2). It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described here referencing FIGS. 2-5.

A first audio device (audio device 221) on the network is given notice that a second audio device (audio device 222) not on the network is available, as shown by block 610. For example, a user may use a graphical user interface (GUI) on a controller application on the smart phone (controller) 224 to notify the application on the controller 224 that the second audio device 222 is available, and the controller 224 may transmit a notice message to the first audio device 221. In response to this notice message, the first audio device 221 provides a bridge network 320 (FIG. 3), as shown by block 620. The bridge network 320 may be a wireless network distinct from the network 212. The bridge network 320 may be WiFi, BlueTooth, ZigBee, RF, or another wireless network protocol. The bridge network 320, or temporary access point (AP), is generally a short duration network, where the bridge network is established temporarily during a configuration time window, and disabled after configuration is complete. In general, the bridge network 320 includes a proprietary protocol, so that only pre-configured audio devices will recognize and/or be recognized by the bridge network 320. The second audio device 222 detects the first audio device 221 and connects to the bridge network 320, for example, using a pre-shared key (PSK).

A bridge communication channel is established between the first audio device 221 and the second audio device 222 via the bridge network 320, as shown by block 630. The first audio device 221 may notify the controller 224 that the first audio device 221 has established a bridge channel over the bridge network 320 with the second audio device 222.

The user of the controller 224 may be prompted by the controller 224 to request the second audio device 222 to initiate a handshake with the first audio device 221 over the bridge network 320 so that the first audio device 221 and second audio device 222 can exchange network credentials. For example, the application on the controller 224 may display a visual prompt via the controller application GUI instructing the user to manually initiate the handshake by pushing a button on the second audio device 222. Alternatively, the second audio device 222 may alert the user to manually initiate the handshake, for example, with a flashing LED or an audio signal such as a loud beep, or even by playing a pre-recorded audio message. The user may respond to this alert by manually initiating the handshake via a button push on the second audio device 222.

The first audio device 221 provides network credentials for the network 210 to the second audio device 222 over the bridge network 320 channel, as shown by block 640. The second audio device 222 establishes connection to the network 210 using the network credentials provided to the second audio device 222 by the first audio device 221, as shown by block 650 and FIG. 4. The bridge network 320 may be discontinued after the second audio device 222 has joined the network 210. The controller 224 may discover the second audio device 222 on the network 210, for example, using a discovery protocol. Once the controller 224 has discovered the second audio device 222, the controller application on the controller 224 may add the second audio device 222 to the group 220. For example, the controller 224 may assign an audio channel to be reproduced by the second audio device, where the audio channel is one of two or more audio channels rendering an audio and/or video program by the group 220. FIG. 5 is a schematic diagram showing the wireless network after the controller 224 has discovered the second audio device 222.

Figure 8:
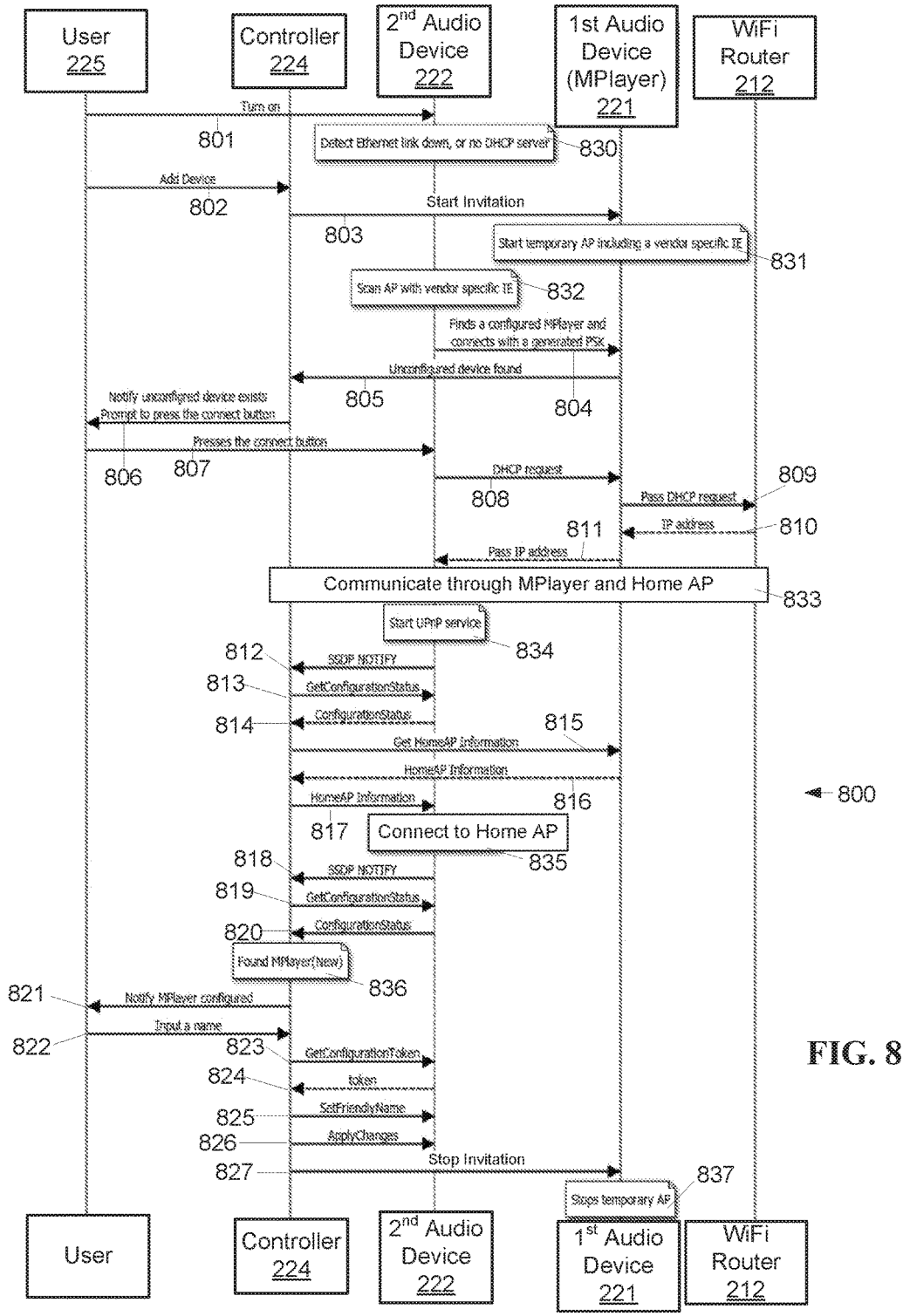
FIG. 8 is a timing diagram illustrating one implementation of the timing for the exemplary method of FIG. 6.

FIG. 8 is a timing diagram 800 illustrating one implementation of the timing for the exemplary method 600 for discovery by the first audio device 221 and the controller 224 of a second audio device 222 in a WiFi network. It should be noted that any process descriptions, actions or blocks in timing diagrams should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The timing diagram 800 includes actions between system entities, indicated by arrows 801-827, and actions performed by a single system entity, as shown by blocks 830-837. The user 225 turns on the second audio device 222, as shown by action 801, and the second audio device may detect that it does not have a working network connection, for example, by detecting the Ethernet link is down, or by finding no DHCP server, as shown by block 830. The user 255 then adds a device to the controller 224, as shown by action 801. For example, the user 255 may use a graphical user interface of the controller 224 to notify the controller 224 to add the second audio device 222 to a list of devices. This may be accomplished by the user 225 selecting "Add Device" from a settings menu of the controller 224. The specific behavior described above may depend on whether or not the first audio device 221 has network SSID and Password information. For example, depending upon the specific network, the user 225 may enter a network password and/or SSID that the controller 224 is using.

The controller 224 notifies the previously configured first audio device 221 to start an invitation process, as shown by action 803. The configured first audio device 221 starts a temporary access point (AP), or bridge network, including a vendor specific information element (IE), as shown by block 831. The second audio device 222 scans the temporary AP with the vendor specific IE, as shown by block 832. The second audio device 222 finds the first audio device 221 on the bridge network and the second audio device 222 connects to the first audio device 221 on the bridge network with a generated pre-shared key (PSK), as shown by action 804. The first audio device 221 notifies the controller 224 that an un-configured device, namely the second audio device 222, has been detected, as shown by action 805. The controller 224 notifies the user 225 that the second audio device 222 is available to connect on the network, as shown by action 806. This notification may be, for example, via the GUI of the controller 224, or via other notification means, for example, an audible or visual indicator on the controller, 224, the first audio device 221, and/or the second audio device 222.

The connection of the second audio device 222 to the network is then initiated by the user 225, for example, by pushing a connect button or another actuator on the second audio device, as shown by action 807. The second audio device 222 generates a DHCP request to the first audio device 221, for example, via the bridge network, as shown by action 808, and the second audio device 222 passes the DHCP request to a network router having a DHCP server, for example, the WiFi router 212, as shown by action 809.

For example, the second audio device 222 may initiate an DHCP client and send a "DHCP discover" command to the DHCP server of the WiFi router 212 via the configured first audio device 221. The WiFi router 212 forwards an IP address to the first audio device 221, as shown by action 810, and the first audio device 221 passes the IP address to the second audio device 222, as shown by action 811. For example, the WiFi router 212 DHCP server sends a response "DHCP offer" command to the second audio device 222 via the configured first audio device 221. At this time, the IP address of the second audio device 222 is assigned. The second audio device 222 connects to the WiFi router 212 via the WiFi network using the received IP address, so the controller 224, the first audio device 221, the second audio device 222, and the WiFi router 212 may all communicate via the WiFi network, as shown by block 833.

The second audio device 222 starts UPnP (Universal Plug and Play) function for configuring, as shown by block 834, and sends a "SSDP (Simple Service Discovery Protocol) notify" command to the controller 224, as shown by action 812. The controller 224 configures the second audio device 222 with UPnP commands, as shown by actions 813 and 814. Optionally, the controller 224 may retrieve information for a home AP, for example, the SSID and/or password from the first audio device 221, as shown by actions 815 and 816. A home AP is typically an existing local hardware device called a "router" or "wi-fi router" that provides network access to devices located within the home via wired and wireless connections. It allows the devices on the local network to access an external network such as the Internet via it's built-in routing and bridging functions.

The controller 224 sends the home AP information to the second audio device 222, as shown by action 817. The second audio device 222 connects to the home AP, as shown by block 835. If the connection fails, the second audio device 222 front panel indicator may indicate an alert, for example, with a flashing light. Otherwise the second audio device notifies the controller 224 of the SSDP, as shown by action 818. The controller 224 may request and receive configuration status from the second audio device 222, as shown by actions 819 and 820. The controller 224 declares the second audio device 222 as being found, as shown by block 836, and notifies the user that the second audio device 222 is configured, and the second audio device 222 should be closed to the home AP, as shown by action 821.

The user 225 may forward a name for the second audio device 222 to the controller 224, as shown by action 222. The controller 224 may then negotiate with the second audio device 222 to set the name of the second audio device 222, as shown by actions 823-826. For example, the controller 224 may request a configuration token from the second audio device 222 with a GetConfigurationToken command, as shown by action 823, and the second audio device 222 may respond by sending a configuration token to the controller 224, as shown by action 824. The configuration token may include information indicating the current configuration state of the second audio device 222. The controller 224 may compare the information indicating the current configuration state of the second audio device 222, and send the second audio device 222 a name change command (SetFriendlyName, as per action 825), and may further update the configuration of the second audio device 221 via an ApplyChanges command, as shown by action 226. The controller 224 sends a "Stop Invitation" command to the first audio device 221, as shown by action 827. The first audio device 221 stops the temporary (bridge) AP, as shown by block 837.

System

As previously mentioned, the present system for executing the functionality of the audio devices 221, 222 (FIGS. 2-5) described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. The I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

The I/O devices 510 include a communication processor 528. The communication processor may control and/or include a Wi-Fi interface 522, for example, but not limited to an interface configured to an IEEE 802.11bgn network interface, among other possible wireless network interfaces. A bridge network interface 524 is configured to provide wireless communication independently of the Wi-Fi interface 522, as described above. A cable interface 526 provides a hard-wired communications interface, for example, between the players 221, 222 and the controller application.

When the system 500 is in operation, the processor 502 is configured to execute the software 508 stored within the memory 506 to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adding a second audio device into a wireless network comprising a wireless network router, a first audio device, and a controller application running on a controller device, comprising the steps of:
   receiving by a first audio device on the network notice that a second audio device not on the network is available;
   providing a bridge network by the first audio device;
   establishing a bridge channel between the first audio device and the second audio device via the bridge network;
   providing network credentials to the second audio device over the bridge channel;
   using the provided network credentials, establish a network connection for second audio device;
   providing a DHCP request to the first audio device by the second audio device via the bridge network;
   forwarding the DHCP request by the first audio device to the wireless network router via the wireless network;
   receiving the provided network credentials by the first audio device from the wireless network router via the wireless network;
   detecting, by the second audio device, the bridge network;
   connecting, by the second audio device, to the bridge network;
   notifying the controller application the first audio device has established a bridge channel with the second audio device; and
   via a GUI on the controller application, requesting the user to initiate an audio device network handshake over the bridge channel.

2. The method of claim 1, wherein the first audio device receives from the controller application the notice the second audio device is available.

3. The method of claim 1, further comprising the step of discovering the second audio device on the network by the controller application.

4. The method of claim 1, further comprising the step of detecting, by the second audio device, the bridge network.

5. The method of claim 4, further comprising the step of connecting, by the second audio device, to the bridge network.

6. The method of claim 1, further comprising the step of via a GUI on the controller application, requesting the user to initiate an audio device network handshake over the bridge channel.

7. The method of claim 6, further comprising the step of initiating the DHCP request by the second audio device via an actuator on the second audio device.

8. The method of claim 7, further comprising the step of discovering the second audio device on the network by the controller application.

9. The method of claim 1, further comprising the steps of:
   receiving by the controller application from the first audio device, configuration information for an internet access point;
   sending, by the controller application, the configuration information for the internet access point to the second device;
   using the configuration information for the internet access point, by the second device, to connect to the access point.

10. The method of claim 9, further comprising the step of requesting from the first audio device, the configuration information for the internet access point.

11. The method of claim 1, further comprising the steps of:
    receiving by the controller application from the user, a name for the second audio device;
    requesting, by the controller application, a configuration information token from the second device;
    receiving, by the controller application, the configuration information token from the second device; and
    receiving, by the second audio device, the name for the second audio device from the controller application.

12. The method of claim 11, further comprising the step of comparing, by the controller application, information from the configuration token with a preconfigured configuration.

13. The method of claim 1, further comprising the step of adding, by the controller application, the second audio device to a group comprising the first audio device.

14. A system operating within a wireless communication network, comprising:
    a first audio device comprising:
      a first communication processor and a first network interface configured to communicate via the wireless communication network; and
      a first processor and a first memory configured to store non-transitory instructions which, when executed by the first processor, perform the steps of:
        receiving notice that a second audio device not on the wireless communication network is available;
        providing a bridge network via the communication processor;
        establishing a bridge channel with the second audio device via the bridge network; and
        providing credentials for the wireless communication network to the second audio device over the bridge channel;
    the second audio device comprising:
      a second communication processor and a second network interface; and
      a second processor and a second memory configured to store non-transitory instructions which, when executed by the second processor, perform the steps of:
        detecting the bridge network via the second interface;
        establishing a bridge channel with the first audio device via the bridge network;
        receiving credentials for the wireless communication network from the second audio device over the bridge channel; and
        using the received network credentials, joining the wireless communication network via the second interface; and
    a controller device in communication with the wireless communication network comprising:
      a third communication processor and a third network interface; and a third processor and a third memory configured to store non-transitory instructions which, when executed by the third processor, perform the steps of:
  providing a controller application comprising a graphical user interface (GUI), the controller application configured to perform the steps of:
    notifying the first audio device the second audio device not on the wireless communication network is available;
    receiving configuration information via the GUI regarding the second audio device, wherein the second audio device is not configured to communicate over the wireless communication network;
    after the second audio device has joined the wireless communication network, discovering the second audio device on the wireless communication network; and
    adding the second audio device on the wireless communication network to a group.

15. The system of claim 14, wherein:
the first audio device is further configured to perform the step of notifying the controller application the first audio device has established a bridge channel with the second audio device; and
the controller device is further configured to perform the step of, via a GUI, requesting the user to initiate a bridge channel handshake between the first audio device and the second audio device.

* * * * *